United States Patent [19]
Gimbal

[11] Patent Number: 4,896,305
[45] Date of Patent: Jan. 23, 1990

[54] ANIMAL LURING DEVICE

[76] Inventor: Eric A. Gimbal, 427 Houston Rd., Ambler, Pa. 19002

[21] Appl. No.: 346,593

[22] Filed: May 2, 1989

[51] Int. Cl.⁴ ............................................. H04B 1/02
[52] U.S. Cl. ................................. 367/139; 340/384 E; 116/22 A
[58] Field of Search ................... 367/139; 340/384 E; 116/22 A; 43/124

[56] References Cited

U.S. PATENT DOCUMENTS

| | | | |
|---|---|---|---|
| 3,673,567 | 6/1972 | McClellan, Sr. | 367/139 |
| 3,683,113 | 8/1972 | Stewart | 367/139 |
| 3,823,691 | 7/1974 | Morgan | 367/139 |
| 3,872,472 | 3/1975 | Moschgat | 340/384 E |
| 3,885,338 | 5/1975 | York | 43/17.1 |
| 3,886,493 | 5/1975 | Farr | 367/49 |
| 4,105,992 | 8/1978 | Luciano | 367/139 |

*Primary Examiner*—Thomas H. Tarcza
*Assistant Examiner*—Ian J. Lobo
*Attorney, Agent, or Firm*—Leon Gilden

[57] ABSTRACT

An animal luring device is set forth wherein a microphone is operatively associated with a recording and play-back mechanism to initially record and then broadcast an animal sound through a selected frequency. The device is operative through an associated photovoltaic cell and circuitry arrangement.

6 Claims, 4 Drawing Sheets

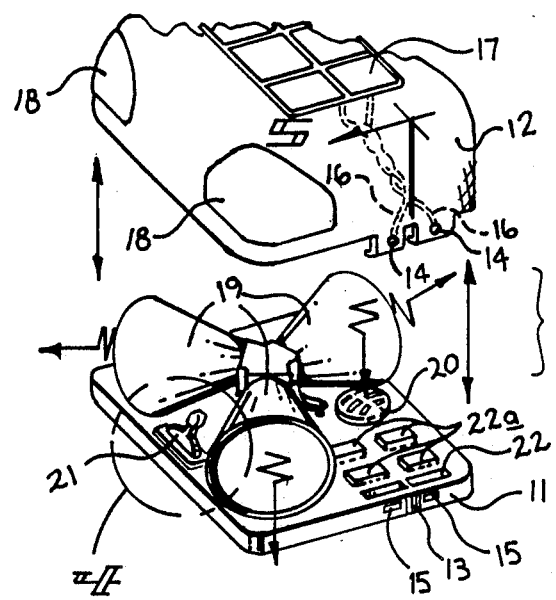
FIG 3
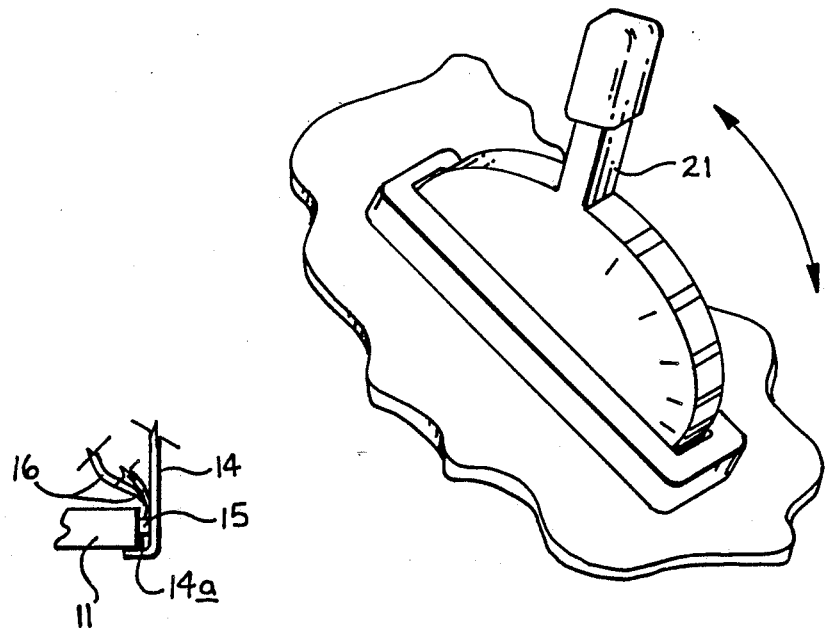
FIG 5
FIG 4

ANIMAL LURING DEVICE

BACKGROUND OF THE INVENTION

1. Field of the Invention

The field of invention relates to animal luring devices, and more particularly pertains to a new and improved animal luring device wherein the same is equipped for the recording and subsequent play-back of predetermined animal sounds of a predetermined frequency for the luring, viewing, and possible entrapment of animals.

2. Description of the Prior Art

The use of synthetic animal sound devices has been provided in the prior art for the luring or discouraging of certain animals within a predetermined area dependent upon need, such as in animal entrapment or in pest control. Prior art devices utilized in animal sound generation technics includes U.S. Pat. No. 3,683,113 to Stewart wherein circuitry is arranged for the generation of signals at certain audible frequencies in accordance with a predetermined animal, such as birds and the like. The signals generated are of a relatively narrow band width utilizing a generator directed through a modulation device that directs such sounds through an associated loudspeaker.

U.S. Pat. No. 3,886,493 to Farr sets forth an organization where the frequency and duration of vibratory signals relative to soil transmissivity for use in scientific determination of a seismic survey.

U.S. Pat. No. 3,885,338 to York sets forth an audible signal generating device for use in the attraction of fish, and more particularly tuna, to assist in the commercial harvest of such fish.

U.S. Pat. No. 3,872,472 to Moschgat sets forth a signalling system for repelling undesirable animals, such as rodents and the like, at a predetermined frequency.

U.S. Pat. No. 4,105,992 to Luciano sets forth a rodent attractant device to lure rodents to a predetermined location.

As such, it may be appreciated that there is a continuing need for a new and improved animal luring device which addresses both the problems of ease of use and effectiveness in construction, and in this respect, the present invention substantially fulfills this need.

SUMMARY OF THE INVENTION

In view of the foregoing disadvantages inherent in the known types of animal luring devices now present in the prior art, the present invention provides an animal luring device wherein the same utilizes a recording and play-back organization powered by solar cells or by DC batteries controlled by circuitry arranged within the device to enable recording of animal sounds along a predetermined frequency band and the subsequent playback of such sounds for the attraction of the animals and subsequent entrapment of such animals. As such, the general purpose of the present invention, which will be described subsequently in greater detail, is to provide a new and improved animal luring device which has all the advantages of the prior art animal luring devices and none of the disadvantages.

To attain this, the present invention comprises a housing base including a self-contained battery and circuitry organization rechargeable by an overlying photovoltaic cell to effect continuous replenishment of the battery during daylight hours. The organization provides for recording through a desired frequency band of various animal sounds through an associated microphone into a recorder play-back device within the base member 11 and further including a trio of speakers to direct such recorded sounds about a 360 degree environment relative to the housing. An overlying housing cover includes a photovoltaic cell and associated electrical lines for electrical communication with the base portion.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved animal luring which has all the advantages of the prior art animal luring devices and none of the disadvantages.

It is another object of the present invention to provide a new and improved animal luring device which may be easily and efficiently manufactured and marketed.

It is a further object of the present invention to provide a new and improved animal luring device which is of a durable and reliable construction.

An even further object of the present invention is to provide a new and improved animal luring device which is susceptible of a low cost of manufacture with regard to both materials and labor, and which accordingly is then susceptible of low prices of sale to the consuming public, thereby making such animal luring device economically available to the buying public.

Still yet another object of the present invention is to provide a new and improved animal luring device which provides in the apparatuses and methods of the prior art some of the advantages thereof, while simultaneously overcoming some of the disadvantages normally associated therewith.

Still another object of the present invention is to provide a new and improved animal luring device wherein the same enables recording of various animal sounds relative to a predetermined frequency band and further enables broadcast of such sounds to attract such animals for viewing or capture thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention illustrating the housing cover removed from the housing base.

FIG. 4 is an isometric illustration of the frequency band regulator of the instant invention.

FIG. 5 is an orthographic view, taken along the section line 5 of FIG. 3.

DESCRIPTION OF THE PREFERRED EMBODIMENT

Figure 1:
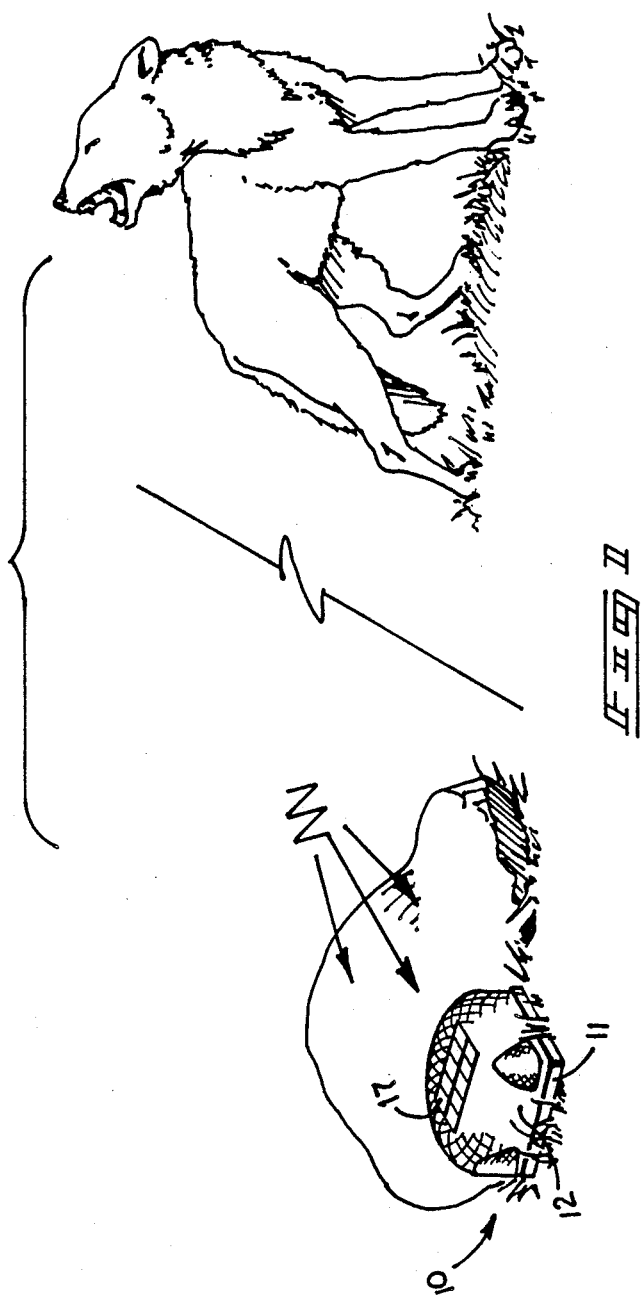
FIG. 1 is an isometric illustration of the instant invention in a recording mode.
Figure 2:
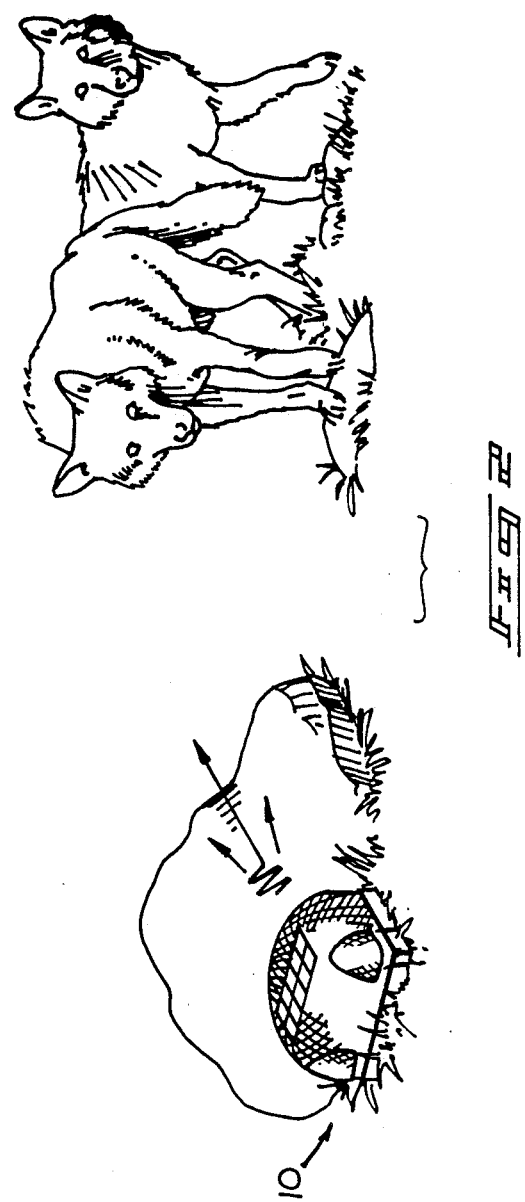
FIG. 2 is an isometric illustration of the invention in a transmitting mode.

With reference now to the drawings, and in particular to FIGS. 1 to 6 thereof, a new and improved animal luring device embodying the principles and concepts of the present invention and generally designated by the reference numeral 10 will be described.

More specifically, the animal luring device 10 essentially comprises a housing base 11 contained therewithin and included battery and associated circuitry for control of the organization, whose organization is to be discussed in more detail below. The housing base 11 includes a housing cover 12 removably mounted overlying the housing base 12 wherein, the housing base 12 includes a pair of opposed registration ridges 13 vertically aligned relative to the housing base 12 on opposed end surfaces of the housing base to cooperate with a gap defined by a plurality of downwardly depending bifurcated legs 14 integrally plurality of downwardly depending bifuracted legs 14 integrally formed to the housing cover 12 at a lowermost perimeter edge thereof wherein the bifurcated legs 14 are provided with integral inwardly directed flanges 14a to underlie the housing base and secure the housing base to the associated housing cover 12 while maintaining registration of the housing cover by aligning the gap defined by the bifurcated legs 14 with the registration ridge 13 of each end surface.

A photovoltaic cell circuit contact pair 15 are formed on the housing base 12 on either side of the registration ridge 13 to electrically contact a plurality of photovoltaic cell circuit lines 16 formed interiorly of the housing cover 12 and formed and terminating on each interior surface of each bifurcated leg 14. A photovoltaic cell 17 is formed at an upper surface of the housing cover 12 to provide replenishment of an associated battery contained within the housing base 11. A trio of speaker screens 18 are directed at 120 degree angles relative to one another about the sides of the housing cover 12 and directed forwardly of a complementary trio of loud speakers 19 fixedly secured to an upper surface of the housing base 11. A microphone 20 enables recording of various animal sounds and utilization of a frequency switch 21 mounted onto the base 11 enables filtering of unwanted frequencies from being recorded and enables only the recording of a frequency of a predetermined band width, dependent on the animal subject.

The controls of the instant invention include an on/off switch 22 and further controls 22a for utilization of the instant invention in a recording or a broadcast mode.

Figure 6:
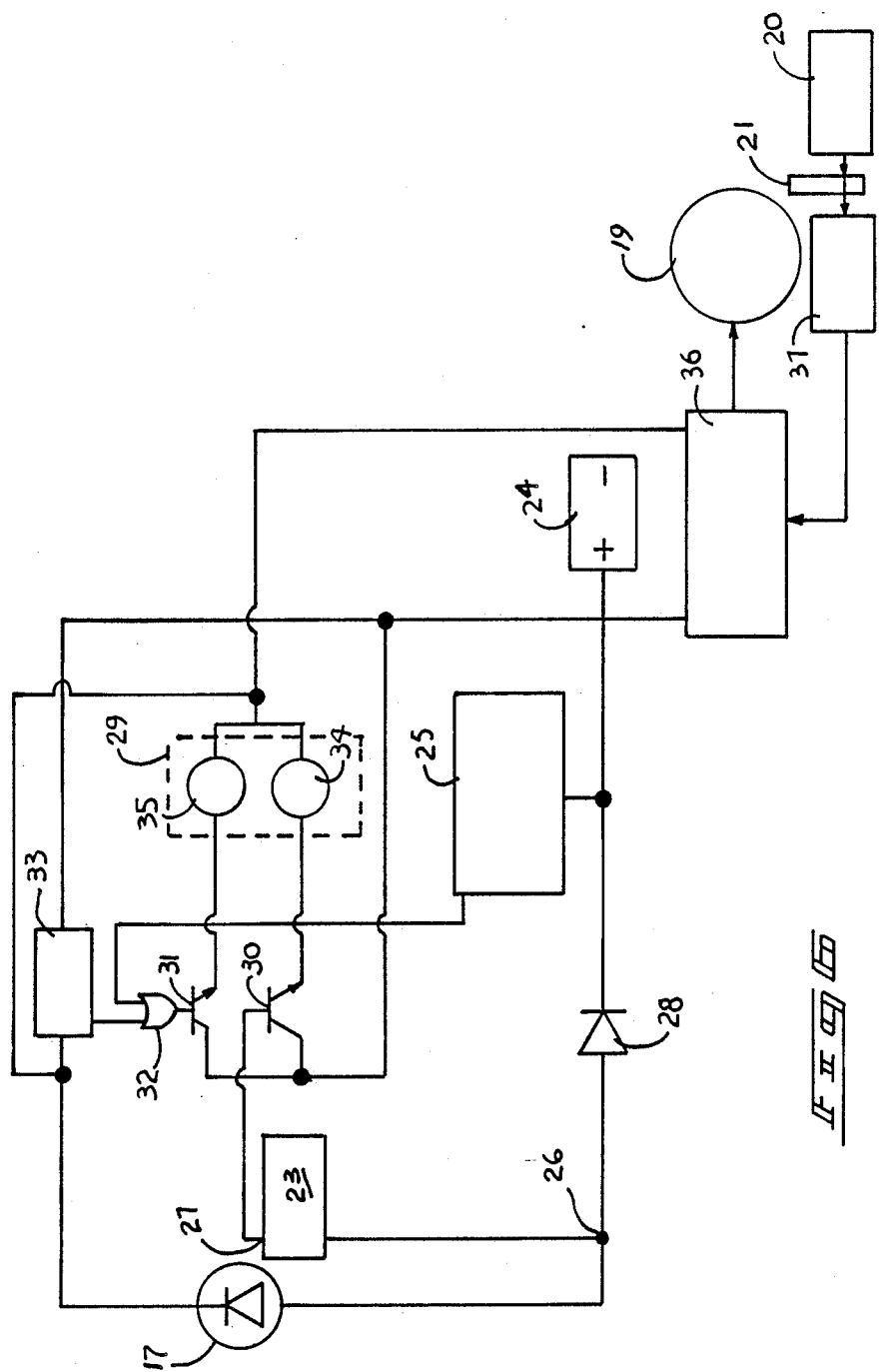
FIG. 6 is a diagrammatic illustration of the electrical circuitry and controller apparatus of the instant invention.

Attention to FIG. 6 illustrates a circuitry utilized with the instant invention wherein a battery 24 contained within the housing base 11 is provided with a recharging circuitry by way of the photovoltaic cell 17.

It is understood that sunlight is available during daylight hours to effect recharging of the battery 24. Accordingly, a desired circuitry is available to prevent overcharging of such a battery wherein a logic circuit 23 includes a circuit to control output of the photovoltaic cell 17. The logic circuit 23 is supplied with a direct current energy source from the associated battery 1 by way of a voltage regulator 25. The output of the logic circuit 23 controls operation of a keep relay 29 which includes a first resistor 30 driven by a sunset signal directed from the logic circuit 23 at the output signal 27 portion of the logic circuit 23 with a second transistor 31 driven by an output signal from the associated timer 33. The keep relay 29 includes a conventional first coil 34 with a second coil 35 to respectively make and break a power output to be directed to the battery 24. In operation, the logic circuit 23 is provided with a zero input signal 26 during periods of sunlight to minimize a recharging of the associated battery 24. When there is a minimal amount of direct sunlight, the output voltage of the photovoltaic cell 17 is higher than that of the associated battery 24 and accordingly, recharging of the battery is directed through the diode 28. During the periods of minimal sunlight, a second signal is directed at the input signal portion 26 of the circuit energizing the first transistor 30 to actuate the first coil 34 within the keep relay 29. After a preset period of time has transpired, an output signal from the timer 33 energizes the second transistor 31 to actuate the second or break coil 35. The OR-gate 32 will energize the second transistor 31 when output of the voltage regulator 25 is at a low level and when off, its potential is directed upwardly driving the OR-gate into actuation of the second transistor 31. In this juncture, the second coil 35 of the keep relay 29 is actuated to direct current and recharging of the battery 24. An associated amplifier 36 receives power from the battery 24 to actuate loud speakers 19 and is in electrical communication with a recorded/player 37 that may play pre-recorded input such as magnetic tape or receive an input signal to record through the microphone 20 by way of the frequency switch 21.

Accordingly, the manner of usage and operation of the instant invention should be apparent from the above disclosure, and no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention to include a portable handheld battery operated directional device as well as fixed unattended devices and any, all combinations thereof.

What is claimed as being new and desired to be protected by Letters Patent of the U.S. is as follows:

1. An animal luring device for selective recording and playback of animal audible sounds comprising,
   a base member including a rechargeable battery and in electrical communication with a microphone and loudspeakers, and
   a recorder/playback member mounted to said base is operably associated with said loudspeakers and said battery and is operative to enable selective recording and playback of audible animal sounds to direct such sounds through the loud speakers, and
   the microphone in selective electrical communication with the recorder/playback member to selectively record animal sounds, and
   frequency controller to select a predetermined frequency for filtering undesirable audible sounds during recording, and
   a photovoltaic cell positioned within a housing cover selectively associated with the base member to recharge the battery for extended and remote use of the device.

2. An animal luring device as set forth in claim 1 wherein the housing cover is selectively securable to the base member.

3. An animal luring device as set forth in claim 2 wherein the housing cover further includes a plurality of bifurcated legs extending downwardly from the housing cover to define a slot therebetween, and the slot selectively in registration with a raised ridge formed on opposed side surfaces of the base member.

4. An animal luring device as set forth in claim 3 wherein a plurality of electrical lines are operably associated with the photovoltaic cell and formed upon interior surfaces of the bifurcated legs, and a plurality of contacts positioned on opposed sides of the ridge formed on the base member to electrically associate circuitry contained within the base member in operative association with the photovoltaic cell.

5. An animal luring device as set forth in claim 4 further including a logic circuit, a voltage regulator, and a single diode in operative association with the battery formed within a circuit within the base member to prevent overcharging of the battery contained within the base member.

6. An animal luring device as set forth in claim 5 further including a first and second coil contained within a relay within the circuit to control recharging of the battery.

* * * * *